US008637211B2

(12) United States Patent
Fujimura et al.

(10) Patent No.: US 8,637,211 B2
(45) Date of Patent: Jan. 28, 2014

(54) METHOD FOR INTEGRATED CIRCUIT MANUFACTURING AND MASK DATA PREPARATION USING CURVILINEAR PATTERNS

(75) Inventors: Akira Fujimura, Saratoga, CA (US); Michael Tucker, Los Altos, CA (US)

(73) Assignee: D2S, Inc., San Jose, CA (US)

( * ) Notice: Subject to any disclaimer, the term of this patent is extended or adjusted under 35 U.S.C. 154(b) by 120 days.

(21) Appl. No.: 13/269,618

(22) Filed: Oct. 9, 2011

(65) Prior Publication Data

US 2012/0094219 A1 Apr. 19, 2012

Related U.S. Application Data

(60) Provisional application No. 61/392,477, filed on Oct. 13, 2010.

(51) Int. Cl.
*G03F 1/20* (2012.01)
*G03F 9/00* (2006.01)

(52) U.S. Cl.
USPC ............... 430/5; 430/30; 430/296; 430/396; 430/942; 716/53; 716/55

(58) Field of Classification Search
USPC ............. 430/5, 30, 296, 396, 942; 716/53, 55
See application file for complete search history.

(56) References Cited

U.S. PATENT DOCUMENTS

| 6,037,601 | A | 3/2000 | Okunuki |
|---|---|---|---|
| 6,416,912 | B1 | 7/2002 | Kobayashi et al. |
| 6,917,048 | B2 | 7/2005 | Fujiwara et al. |
| 7,024,650 | B2 | 4/2006 | Teig et al. |
| 7,759,027 | B2 | 7/2010 | Fujimura et al. |
| 7,799,489 | B2 | 9/2010 | Fujimura et al. |
| 7,901,850 | B2 | 3/2011 | Fujimura et al. |
| 8,017,288 | B2 | 9/2011 | Fujimura et al. |
| 8,039,176 | B2 | 10/2011 | Fujimura et al. |
| 2002/0129328 | A1 | 9/2002 | Komatsuda |
| 2005/0053850 | A1 | 3/2005 | Askebjer et al. |
| 2005/0075819 | A1 | 4/2005 | Paxton et al. |
| 2005/0287451 | A1 | 12/2005 | Hudek et al. |
| 2007/0114463 | A1 | 5/2007 | Nakasugi et al. |
| 2007/0162889 | A1 | 7/2007 | Broeke et al. |
| 2008/0116398 | A1 | 5/2008 | Hara et al. |
| 2008/0213677 | A1 | 9/2008 | Saito |
| 2010/0055580 | A1 | 3/2010 | Fujimura et al. |
| 2010/0055585 | A1 | 3/2010 | Fujimura et al. |
| 2010/0058279 | A1 | 3/2010 | Fujimura et al. |
| 2010/0058282 | A1 | 3/2010 | Fujimura et al. |
| 2010/0183963 | A1 | 7/2010 | Zable et al. |
| 2010/0209834 | A1 | 8/2010 | Yao et al. |
| 2011/0045409 | A1 | 2/2011 | Fujimura |
| 2011/0053056 | A1 | 3/2011 | Fujimura et al. |
| 2011/0177458 | A1 | 7/2011 | Kotani et al. |
| 2011/0191727 | A1 | 8/2011 | Fujimura et al. |
| 2012/0084740 | A1 | 4/2012 | Fujimura et al. |

FOREIGN PATENT DOCUMENTS

| JP | 1992155337 | 5/1992 |
|---|---|---|
| WO | 03036386 A | 5/2003 |
| WO | 2010025031 A2 | 3/2010 |
| WO | 2010025032 A2 | 3/2010 |
| WO | 2011025795 A1 | 3/2011 |

OTHER PUBLICATIONS

International Search Report and Written Opinion dated Dec. 20, 2012 for PCT Application No. PCT/US2012/054526.
Notice of Allowance and Fees due dated Mar. 6, 2013 for U.S. Appl. No. 13/168,954.
Office Action dated Dec. 24, 2012 for U.S. Appl. No. 13/168,954.
Office Action dated Jul. 10, 2012 for U.S. Appl. No. 13/168,954.
International Search Report and Written Opinion dated Sep. 13, 2012 for PCT Patent Application No. PCT/US2012/043042.
International Search Report and Written Opinion dated Apr. 27, 2012 for PCT Application No. PCT/US2011/055535.
International Search Report and Written Opinion dated Apr. 30, 2012 for PCT Application No. PCT/US2011/055536.
Martin, L. et al., "Development of Multiple Pass Exposure in Electron Beam Direct Write Lithography for Sub-32nm Nodes", Proceedings of SPIE, vol. 7488 (2009), pp. 74881C-1-74881C-12, SPIE, P.O. Box 10, Bellingham, WA. 98227, U.S.A.
Martin, L. et al., "New Writing Strategy in Electron Beam Direct Write Lithography to Improve Critical Dense Lines Patterning for Sub-45nm Nodes", Proceedings of SPIE, vol. 7470 (2009), pp. 74700R-1-74700R-12, SPIE, P.O. Box 10, Bellingham, WA. 98227, U.S.A.
Notice of Allowance dated Jul. 12, 2011 for U.S. Appl. No. 12/750,709.
International Search Report and Written Opinion dated Jul. 24, 2013 for PCT Application No. PCT/US2013/036671.
International Search Report and Written Opinion dated Jul. 29, 2013 for PCT Application No. PCT/US2013/036669.
Notice of Allowance and Fees dated Aug. 21, 2013 for U.S. Appl. No. 13/924,019.
Office Action dated Aug. 30, 2013 for U.S. Appl. No. 13/236,610.

*Primary Examiner* — Christopher Young
(74) *Attorney, Agent, or Firm* — The Mueller Law Office, P.C.

(57) ABSTRACT

A method for manufacturing a semiconductor device is disclosed, wherein during the physical design process, a curvilinear path is designed to represent an interconnecting wire on the fabricated semiconductor device. A method for fracturing or mask data preparation (MDP) is also disclosed in which a manhattan path which is part of the physical design of an integrated circuit is modified to create a curvilinear pattern, and where a set of charged particle beam shots is generated, where the set of shots is capable of forming the curvilinear pattern on a resist-coated surface.

25 Claims, 10 Drawing Sheets

METHOD FOR INTEGRATED CIRCUIT MANUFACTURING AND MASK DATA PREPARATION USING CURVILINEAR PATTERNS

RELATED APPLICATIONS

This application claims priority from U.S. Provisional Patent Application Ser. No. 61/392,477, filed Oct. 13, 2010, entitled "Method For Integrated Circuit Manufacturing and Mask Data Preparation Using Curvilinear Patterns"; which is hereby incorporated by reference for all purposes.

BACKGROUND OF THE DISCLOSURE

The present disclosure is related to the manufacturing of integrated circuits, and more particularly to the use of curvilinear patterns for making photomasks.

In the production or manufacturing of semiconductor devices, such as integrated circuits, optical lithography may be used to fabricate the semiconductor devices. Optical lithography is a printing process in which a lithographic mask or photomask manufactured from a reticle is used to transfer patterns to a substrate such as a semiconductor or silicon wafer to create the integrated circuit (I.C.). Other substrates could include flat panel displays, holographic masks, or even other reticles. While conventional optical lithography uses a light source having a wavelength of 193 nm, extreme ultraviolet (EUV) or X-ray lithography are also considered types of optical lithography in this application. The reticle or multiple reticles may contain a circuit pattern corresponding to an individual layer of the integrated circuit, and this pattern can be imaged onto a certain area on the substrate that has been coated with a layer of radiation-sensitive material known as photoresist or resist. Once the patterned layer is transferred the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Eventually, a combination of multiples of devices or integrated circuits will be present on the substrate. These integrated circuits may then be separated from one another by dicing or sawing and then may be mounted into individual packages. In the more general case, the patterns on the substrate may be used to define artifacts such as display pixels, holograms, or magnetic recording heads.

In the production or manufacturing of semiconductor devices, such as integrated circuits, non-optical methods may be used to transfer a pattern on a lithographic mask to a substrate such as a silicon wafer. Nanoimprint lithography (NIL) is an example of a non-optical lithography process. In nanoimprint lithography, a lithographic mask pattern is transferred to a surface through contact of the lithography mask with the surface.

In the production or manufacturing of semiconductor devices, such as integrated circuits, maskless direct write may also be used to fabricate the semiconductor devices. Maskless direct write is a printing process in which charged particle beam lithography is used to transfer patterns to a substrate such as a semiconductor or silicon wafer to create the integrated circuit. Other substrates could include flat panel displays, imprint masks for nano-imprinting, or even reticles. Desired patterns of a layer are written directly on the surface, which in this case is also the substrate. Once the patterned layer is transferred the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Some of the layers may be written using optical or non-optical lithography while others may be written using maskless direct write to fabricate the same substrate. Also, some patterns of a given layer may be written using optical or non-optical lithography, and other patterns written using maskless direct write. Eventually, a combination of multiples of devices or integrated circuits will be present on the substrate. These integrated circuits are then separated from one another by dicing or sawing and then mounted into individual packages. In the more general case, the patterns on the surface may be used to define artifacts such as display pixels, holograms, or magnetic recording heads.

Two common types of charged particle beam lithography are variable shaped beam (VSB) and character projection (CP). These are both sub-categories of shaped beam charged particle beam lithography, in which a precise electron beam is shaped and steered so as to expose a resist-coated surface, such as the surface of a wafer or the surface of a reticle. In VSB, these shapes are simple shapes, usually limited to rectangles of certain minimum and maximum sizes and with sides which are parallel to the axes of a Cartesian coordinate plane (i.e. of "manhattan" orientation), and 45 degree right triangles (i.e. triangles with their three internal angles being 45 degrees, 45 degrees, and 90 degrees) of certain minimum and maximum sizes. At predetermined locations, doses of electrons are shot into the resist with these simple shapes. The total writing time for this type of system increases with the number of shots. In character projection (CP), there is a stencil in the system that has in it a variety of apertures or characters which may be complex shapes such as rectilinear, arbitrary-angled linear, circular, nearly circular, annular, nearly annular, oval, nearly oval, partially circular, partially nearly circular, partially annular, partially nearly annular, partially nearly oval, or arbitrary curvilinear shapes, and which may be a connected set of complex shapes or a group of disjointed sets of a connected set of complex shapes. An electron beam can be shot through a character on the stencil to efficiently produce more complex patterns on the reticle. In theory, such a system can be faster than a VSB system because it can shoot more complex shapes with each time-consuming shot. Thus, an E-shaped pattern shot with a VSB system takes four shots, but the same E-shaped pattern can be shot with one shot with a character projection system. Note that VSB systems can be thought of as a special (simple) case of character projection, where the characters are just simple characters, usually rectangles or 45-45-90 degree triangles. It is also possible to partially expose a character. This can be done by, for instance, blocking part of the particle beam. For example, the E-shaped pattern described above can be partially exposed as an F-shaped pattern or an I-shaped pattern, where different parts of the beam are cut off by an aperture. This is the same mechanism as how various sized rectangles can be shot using VSB. In this disclosure, partial projection is used to mean both character projection and VSB projection.

As indicated, in lithography the lithographic mask or reticle comprises geometric patterns corresponding to the circuit components to be integrated onto a substrate. The patterns used to manufacture the reticle may be generated utilizing computer-aided design (CAD) software or programs. In designing the patterns the CAD program may follow a set of pre-determined design rules in order to create the reticle. These rules are set by processing, design, and end-use limitations. An example of an end-use limitation is defining the geometry of a transistor in a way in which it cannot sufficiently operate at the required supply voltage. In particular, design rules can define the space tolerance between circuit devices or interconnect lines. The design rules are, for example, used to ensure that the circuit devices or lines do not interact with one another in an undesirable manner. For example, the design rules are used so that lines do not get too close to each other in a way that may cause a short circuit. The design rule limitations reflect, among other things, the smallest dimensions that can be reliably fabricated. When referring to these small dimensions, one usually introduces the concept of a critical dimension. These are, for instance, defined as the smallest width of a line or the smallest space between two lines, those dimensions requiring exquisite control.

One goal in integrated circuit fabrication by optical lithography is to reproduce the original circuit design on the substrate by use of the reticle. Integrated circuit fabricators are always attempting to use the semiconductor wafer real estate as efficiently as possible. Engineers keep shrinking the size of the circuits to allow the integrated circuits to contain more circuit elements and to use less power. As the size of an integrated circuit critical dimension is reduced and its circuit density increases, the critical dimension of the circuit pattern or physical design approaches the resolution limit of the optical exposure tool used in conventional optical lithography. As the critical dimensions of the circuit pattern become smaller and approach the resolution value of the exposure tool, the accurate transcription of the physical design to the actual circuit pattern developed on the resist layer becomes difficult. To further the use of optical lithography to transfer patterns having features that are smaller than the light wavelength used in the optical lithography process, a process known as optical proximity correction (OPC) has been developed. OPC alters the physical design to compensate for distortions caused by effects such as optical diffraction and the optical interaction of features with proximate features. OPC includes all resolution enhancement technologies performed with a reticle.

Design rules for many current integrated circuit fabrication processes allow shapes to be designed that are much smaller in their minimum dimension than the wavelength of the light that will be used to transfer the design pattern from a mask to the wafer. In some advanced processes the design rules dictate a preferred wiring direction or orientation on one or more layers. For example, a process may restrict shapes on a given layer to have their longest dimension be aligned with the x-axis of the Cartesian plane. Alternatively, shapes having the smallest minimum dimension or minimum width may be restricted to the preferred orientation, but shapes with a width larger than the minimum width may not be restricted.

There are a number of technologies used for forming patterns on a reticle, including using optical lithography or charged particle beam lithography. The most commonly used system is the variable shaped beam (VSB), where, as described above, doses of electrons with simple shapes such as manhattan rectangles and 45-degree right triangles expose a resist-coated reticle surface. In conventional mask writing, the doses or shots of electrons are conventionally designed to avoid overlap wherever possible, so as to greatly simplify calculation of how the resist on the reticle will register the pattern.

Integrated circuits are physically designed with a plurality of layers, each of which contains a plurality of patterns. Many conventional integrated circuit design methodologies require that all patterns or shapes for many of the layers in a design be manhattan, so that edges of all patterns are parallel to the integrated circuit boundary. All corners in the patterns are therefore 90 degree angles. The mask-making process may gently round off these 90 degree corners. However, because of the limitations of optical lithography, the patterns registered by the resist on the substrate may be much more substantially rounded in the corners, for example, than the patterns on the mask. The resulting curvilinear patterns on the substrate therefore substantially differ from the post-OPC design pattern, and from the pattern on the mask. The differences between the pattern on the mask and the pattern registered by the resist on the substrate results in a high sensitivity to process changes, so that small process variations may cause relatively large changes in the curvilinear patterns on the substrate, perhaps affecting functional or parametric yield of an integrated circuit. It is desirable to reduce the sensitivity to process changes, thereby allowing improvement in integrated circuit yield.

SUMMARY OF THE DISCLOSURE

In one embodiment of the present invention, a method is disclosed for manufacturing a semiconductor device, wherein during the physical design process, a curvilinear path is designed to represent an interconnecting wire on the fabricated integrated circuit.

A method for fracturing or mask data preparation (MDP) is also disclosed in which a manhattan path which is part of the physical design for an integrated circuit is modified to create a curvilinear interconnect pattern, and where a set of charged particle beam shots is generated, where the set of shots is capable of forming the curvilinear pattern on a resist-coated surface.

DETAILED DESCRIPTION OF THE EMBODIMENTS

The current invention utilizes curvilinear patterns on the mask to produce curvilinear patterns on the substrate. The use of a curvilinear pattern on the mask which more closely matches the expected curvilinear pattern on the substrate reduces the sensitivity of the substrate pattern to process variations. In some embodiments, curvilinear patterns are designed into the layout in the design phase. In other embodiments, manhattan patterns in the originally-designed layout are later modified into curvilinear patterns.

Figure 1:
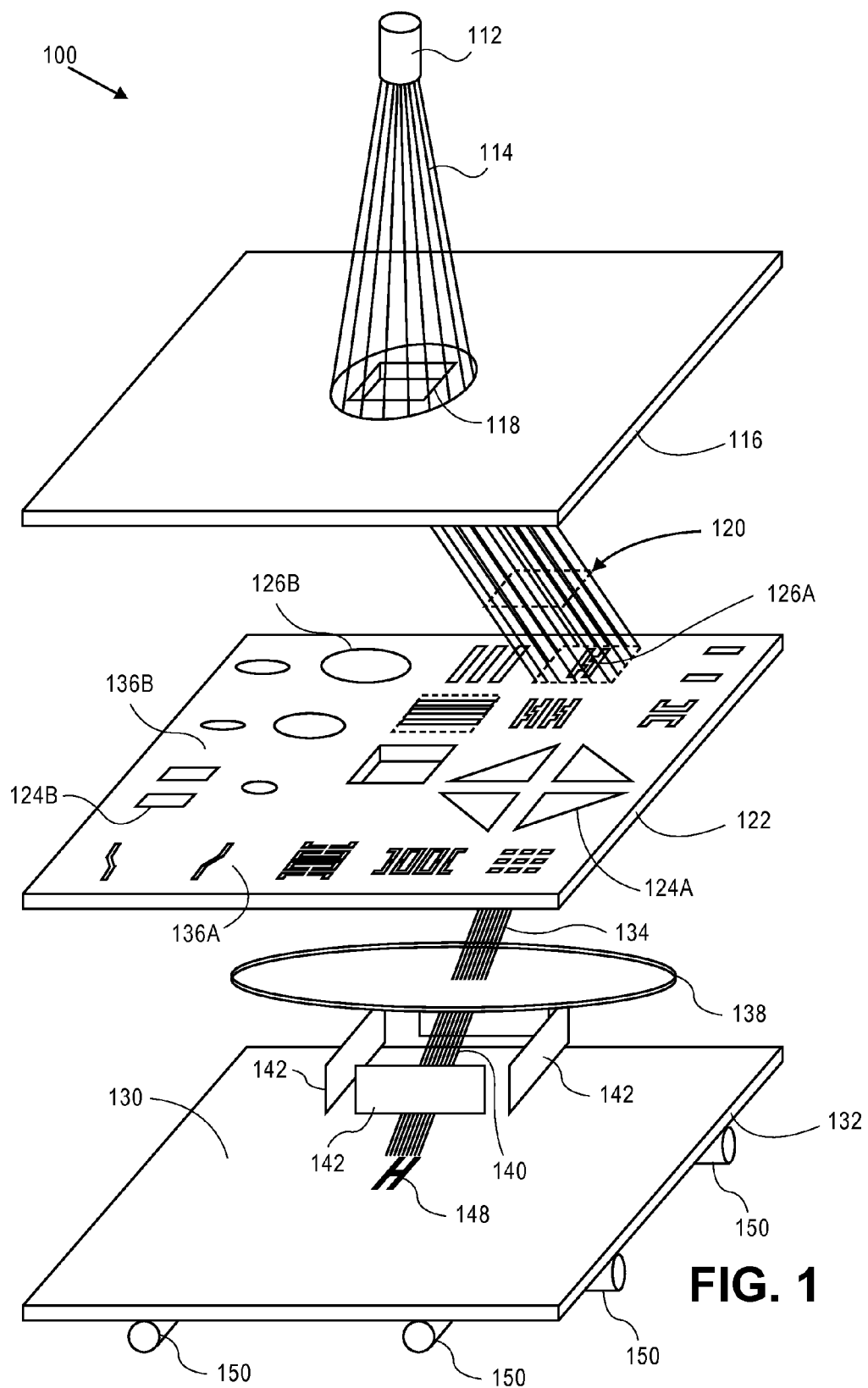
FIG. 1 illustrates an example of a character projection charged particle beam system.

Referring now to the drawings, wherein like numbers refer to like items, FIG. 1 illustrates an embodiment of a conventional lithography system 100, such as a charged particle beam writer system, in this case an electron beam writer system, that employs character projection to manufacture a surface 130. The electron beam writer system 100 has an electron beam source 112 that projects an electron beam 114 toward an aperture plate 116. The plate 116 has an aperture 118 formed therein which allows the electron beam 114 to pass. Once the electron beam 114 passes through the aperture 118 it is directed or deflected by a system of lenses (not shown) as electron beam 120 toward another rectangular aperture plate or stencil mask 122. The stencil 122 has formed therein a number of openings or apertures 124 that define various types of characters 126, which may be complex characters. Each character 126 formed in the stencil 122 may be used to form a pattern 148 on a surface 130 of a substrate 132, such as a silicon wafer, a reticle or other substrate. In partial exposure, partial projection, partial character projection, or variable character projection, electron beam 120 may be positioned so as to strike or illuminate only a portion of one of the characters 126, thereby forming a pattern 148 that is a subset of character 126. For each character 126 that is smaller than the size of the electron beam 120 defined by aperture 118, a blanking area 136, containing no aperture, is designed to be adjacent to the character 126, so as to prevent the electron beam 120 from illuminating an unwanted character on stencil 122. An electron beam 134 emerges from one of the characters 126 and passes through an electromagnetic or electrostatic reduction lens 138 which reduces the size of the pattern from the character 126. In commonly available charged particle beam writer systems, the reduction factor is between 10 and 60. The reduced electron beam 140 emerges from the reduction lens 138, and is directed by a series of deflectors 142 onto the surface 130 as the pattern 148, which is depicted as being in the shape of the letter "H" corresponding to character 126A. The pattern 148 is reduced in size compared to the character 126A because of the reduction lens 138. The pattern 148 is drawn by using one shot of the electron beam system 100. This reduces the overall writing time to complete the pattern 148 as compared to using a variable shape beam (VSB) projection system or method. Although one aperture 118 is shown being formed in the plate 116, it is possible that there may be more than one aperture in the plate 116. Although two plates 116 and 122 are shown in this example, there may be only one plate or more than two plates, each plate comprising one or more apertures.

In conventional charged particle beam writer systems the reduction lens 138 is calibrated to provide a fixed reduction factor. The reduction lens 138 and/or the deflectors 142 also focus the beam on the plane of the surface 130. The size of the surface 130 may be significantly larger than the maximum beam deflection capability of the deflection plates 142. Because of this, patterns are normally written on the surface in a series of stripes. Each stripe contains a plurality of sub-fields, where a sub-field is within the beam deflection capability of the deflection plates 142. The electron beam writer system 100 contains a positioning mechanism 150 to allow positioning the substrate 132 for each of the stripes and sub-fields. In one variation of the conventional charged particle beam writer system, the substrate 132 is held stationary while a sub-field is exposed, after which the positioning mechanism 150 moves the substrate 132 to the next sub-field position. In another variation of the conventional charged particle beam writer system, the substrate 132 moves continuously during the writing process. In this variation involving continuous movement, in addition to deflection plates 142, there may be another set of deflection plates (not shown) to move the beam at the same speed and direction as the substrate 132 is moved.

The minimum size pattern that can be projected with reasonable accuracy onto a surface 130 is limited by a variety of short-range physical effects associated with the electron beam writer system 100 and with the surface 130, which normally comprises a resist coating on the substrate 132. These effects include forward scattering, Coulomb effect, and resist diffusion. Beam blur is a term used to include all of these short-range effects. The most modern electron beam writer systems can achieve an effective beam blur radius or $\beta_f$ in the range of 20 nm to 30 nm. Forward scattering may constitute one quarter to one half of the total beam blur. Modern electron beam writer systems contain numerous mechanisms to reduce each of the constituent pieces of beam blur to a minimum. Some electron beam writer systems may allow the beam blur to be varied during the writing process, from the minimum value available on an electron beam writing system to one or more larger values.

The shot dosage of a charged particle beam writer such as an electron beam writer system is a function of the intensity of the beam source 112 and the exposure time for each shot. Typically the beam intensity remains fixed, and the exposure time is varied to obtain variable shot dosages. The exposure time may be varied to compensate for various long-range effects such as back scatter and fogging in a process called proximity effect correction (PEC). Electron beam writer systems usually allow setting an overall dosage, called a base dosage, that affects all shots in an exposure pass. Some electron beam writer systems perform dosage compensation calculations within the electron beam writer system itself, and do not allow the dosage of each shot to be assigned individually as part of the input shot list, the input shots therefore having unassigned shot dosages. In such electron beam writer systems all shots have the base dosage, before proximity effects correction. Other electron beam writer systems do allow dosage assignment on a shot-by-shot basis. In electron beam writer systems that allow shot-by-shot dosage assignment, the number of available dosage levels may be 64 to 4096 or more, or there may be a relatively few available dosage levels, such as 3 to 8 levels. Some embodiments of the current invention are targeted for use with charged particle beam writing systems which allow assignment of dosage levels.

The mechanisms within electron beam writers have a relatively coarse resolution for calculations. As such, mid-range corrections such as may be required for EUV masks in the range of 2 um cannot be computed accurately by current electron beam writers.

Conventionally, shots are designed so as to completely cover an input pattern with rectangular shots, while avoiding shot overlap wherever possible. Also, all shots are designed to have a normal dosage, which is a dosage at which a relatively large rectangular shot, in the absence of long-range effects, will produce a pattern on the surface which is the same size as is the shot size.

In exposing, for example, a repeated pattern on a surface using charged particle beam lithography, the size of each pattern instance, as measured on the final manufactured surface, will be slightly different, due to manufacturing variations. The amount of the size variation is an essential manufacturing optimization criterion. In current mask masking, a root mean square (RMS) variation of no more than 1 nm (1 sigma) in pattern size may be desired. More size variation translates to more variation in circuit performance, leading to higher design margins being required, making it increasingly difficult to design faster, lower-power integrated circuits. This variation is referred to as critical dimension (CD) variation. A low CD variation is desirable, and indicates that manufacturing variations will produce relatively small size variations on the final manufactured surface. In the smaller scale, the effects of a high CD variation may be observed as line edge roughness (LER). LER is caused by each part of a line edge being slightly differently manufactured, leading to some waviness in a line that is intended to have a straight edge. CD variation is, among other things, inversely related to the slope of the dosage curve at the resist threshold, which is called edge slope. Therefore, edge slope, or dose margin, is a critical optimization factor for particle beam writing of surfaces. In this disclosure, edge slope and dose margin are terms that are used interchangeably.

With conventional fracturing, without shot overlap, gaps or dose modulation, the dose margin of the written shapes is considered immutable: that is, there is no opportunity to improve dose margin by a choice of fracturing options. In modern practice, the avoidance of very narrow shots called slivers is an example of a practical rule-based method that helps to optimize the shot list for dose margin.

In a fracturing environment where overlapping shots and dose-modulated shots can be generated, there is both a need and an opportunity to optimize for dose margin. The additional flexibility in shot combinations allowed by use of shot overlap and dose modulation allows generation of fracturing solutions that appear to generate the target mask shapes on the surface, but may do so only under perfect manufacturing conditions. The use of overlapping shots and dose-modulated shots therefore creates incentive to address the issue of dose margin and its improvement.

Figure 2A:
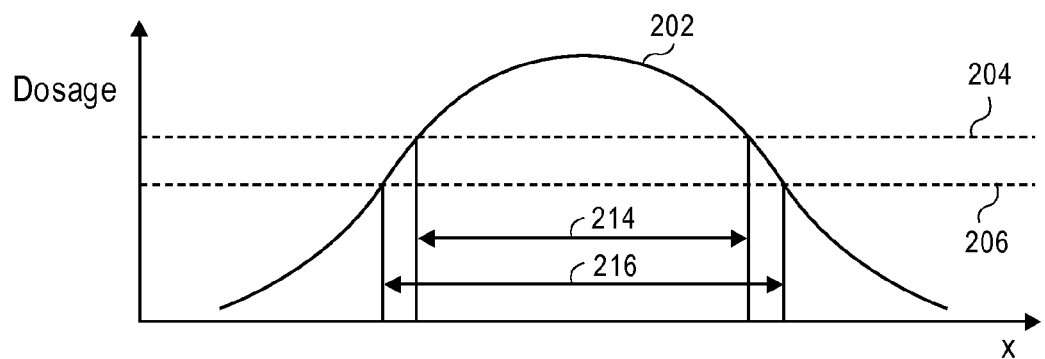
FIG. 2A illustrates an example of a cross-sectional dosage graph, showing the registered pattern widths for each of two resist thresholds.
Figure 2B:
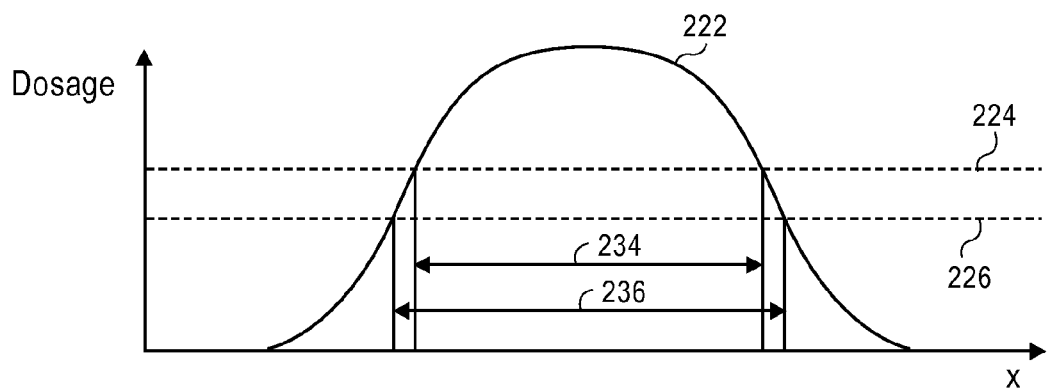
FIG. 2B illustrates an example of a cross-sectional dosage graph similar to FIG. 2A, but with a higher dosage edge slope than in FIG. 2A.

FIGS. 2A-B illustrate how critical dimension variation can be reduced by exposing the pattern on the resist so as to produce a relatively high edge slope in the exposure or dosage curve. FIG. 2A illustrates a cross-sectional dosage curve 202, where the x-axis shows the cross-sectional distance through an exposed pattern—such as the distance perpendicular to two of the pattern's edges—and the y-axis shows the dosage received by the resist. A pattern is registered by the resist where the received dosage is higher than a threshold. Two thresholds are illustrated in FIG. 2A, illustrating the effect of a variation in resist sensitivity. The higher threshold 204 causes a pattern of width 214 to be registered by the resist. The lower threshold 206 causes a pattern of width 216 to be registered by the resist, where width 216 is greater than width 214. FIG. 2B illustrates another cross-sectional dosage curve 222. Two thresholds are illustrated, where threshold 224 is the same as threshold 204 of FIG. 2A, and threshold 226 is the same as threshold 206 of FIG. 2A. The slope of dosage curve 222 is higher in the vicinity of the two thresholds than is the slope of dosage curve 202. For dosage curve 222, the higher threshold 224 causes a pattern of width 234 to be registered by the resist. The lower threshold 226 causes a pattern of width 236 to be registered by the resist. As can be seen, the difference between width 236 and width 234 is less than the difference between width 216 and width 214, due to the higher edge slope of dosage curve 222 compared to dosage curve 202. If the resist-coated surface is a reticle, then the lower sensitivity of curve 222 to variation in resist threshold can cause the pattern width on a photomask manufactured from the reticle to be closer to the target pattern width, thereby increasing the yield of usable integrated circuits when the photomask is used to transfer a pattern to a substrate such as a silicon wafer. Similar improvement in tolerance to variation in dose for each shot is observed for dose curves with higher edge slopes. Achieving a relatively higher edge slope such as in dosage curve 222 is therefore desirable.

As described above, process variations can cause the width of a pattern on a photomask to vary from the intended or target width. The pattern width variation on the photomask will cause a pattern width variation on a wafer which has been exposed using the photomask in an optical lithographic process. The sensitivity of the wafer pattern width to variations in photomask pattern width is called mask edge error factor, or MEEF. In an optical lithography system using a 4× photomask, where the optical lithographic process projects a 4× reduced version of the photomask pattern onto the wafer, a MEEF of 1, for example means that for each 1 nm error in pattern width on a photomask, the pattern width on the wafer will change by 0.25 nm. A MEEF of 2 means that for a 1 nm error in photomask pattern width, the pattern width on the wafer will change by 0.5 nm. For the smallest integrated circuits processes, MEEF may be greater than 2.

Figure 3A:
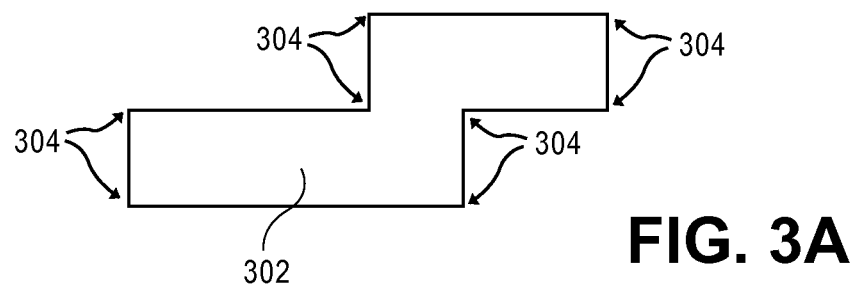
FIG. 3A illustrates an example of a conventional manhattan layout design pattern.
Figure 3B:
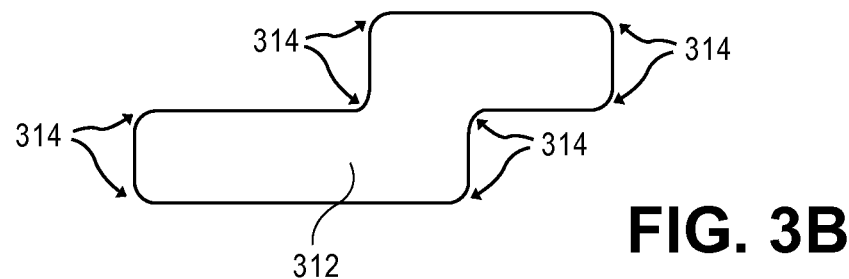
FIG. 3B illustrates an example of the pattern of FIG. 3A after transfer to a photomask using charged particle beam lithography.
Figure 3C:
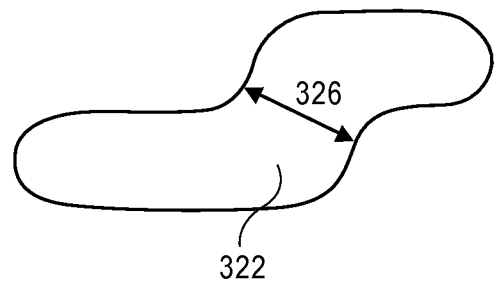
FIG. 3C illustrate an example of the pattern of FIG. 3B after transfer to a substrate using optical lithography.

FIG. 3A illustrates an example of a conventionally-designed manhattan pattern. All edges of the pattern 302 are designed to be parallel to either the x-axis or y-axis of the Cartesian coordinate plane, and all corners 304 in the pattern are right-angle corners. FIG. 3B illustrates an example of a photomask pattern resulting after writing the pattern of FIG. 3A on a reticle using particle beam lithography and manufacturing a photomask from the reticle. The pattern 312 is similar to pattern 302, except that all the corners 314 of pattern 312 are slightly rounded compared to the corners 304 of pattern 302, due to the imprecision of the charged particle beam lithographic process and other steps of the mask-making process. FIG. 3C illustrates an example of a pattern 322 formed on a resist-coated substrate such as a semiconductor wafer, using optical lithography and the mask pattern 312 of FIG. 3B. The pattern 322 exhibits much more rounding of the corners than does pattern 312. As can be seen, the difference between the designed pattern 302 and the substrate pattern 322 is substantial. Furthermore, variations in the optical lithographic process, including resist variations, can affect the shape of the pattern 322 on the substrate, such as how rounded the corners are, which in turn affects, for example, the internal pattern width 326 in the area between the two 90 degree bends.

Figure 4A:
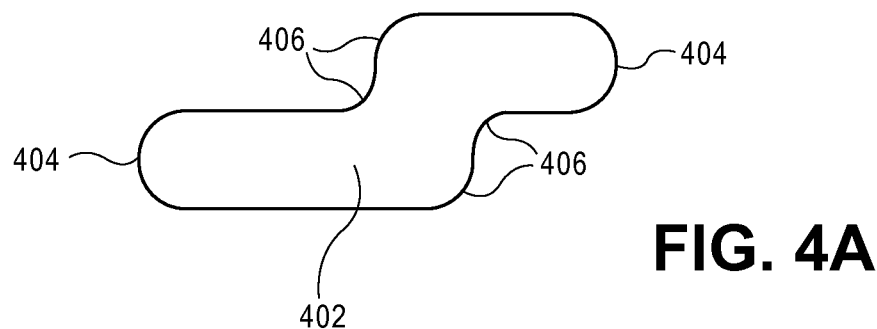
FIG. 4A illustrates an example of a curvilinear layout design pattern, according to an embodiment of the current invention.
Figure 4B:
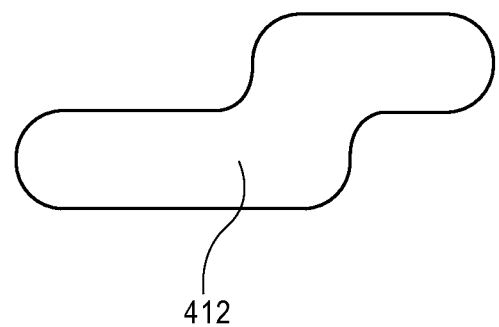
FIG. 4B illustrates an example of the pattern of FIG. 4A after transfer to a photomask using charged particle beam lithography.
Figure 4C:
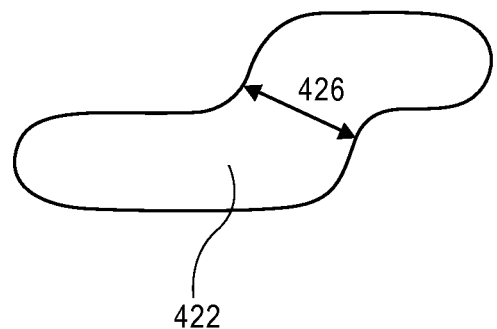
FIG. 4C illustrates an example of the pattern of FIG. 4B after transfer to a substrate using optical lithography.

FIG. 4A illustrates an example of a pattern 402 designed according to one embodiment of the present invention. As can be seen in comparison with pattern 302 of FIG. 3A, pattern 402 has no sharp corners. Instead, each end or line-end 404 of pattern 402 is rounded in a semi-circle. Additionally, each 90 degree bend 406 in pattern 402 is rounded with a 90 degree arc. FIG. 4B illustrates an example of a photomask pattern 412 resulting from writing the pattern 402 of FIG. 4A on a reticle using charged particle beam lithography and manufacturing a photomask from the reticle. The mask-making process, including the exposure using charged particle beam lithography, can form a pattern 412 which is very close to the designed pattern 402. FIG. 4C illustrates an example of a pattern 422 which has been formed on a resist-coated substrate using an optical lithographic process and the mask pattern 412. The pattern 422 is a more faithful transfer of mask pattern 412 than the pattern 322 is of mask pattern 312. Furthermore, variations in the optical lithographic process may affect the shape of pattern 422 less than such variations will affect the shape of pattern 322. The lower sensitivity of substrate pattern 422 to process variations is due to the smaller difference between mask pattern 412 and substrate pattern 422, compared to the difference between mask pattern 312 and substrate pattern 322. The lower sensitivity of pattern 422 to process variations may allow a more precise control of, for example the width 426 of pattern 422 than, for example, the width 326 of pattern 322. This can result in, for example, an increased yield of usable circuits on an integrated circuit wafer, and/or a closer control of integrated circuit performance parameters. In other embodiments of the present invention, a pattern such as pattern 302 may be designed conventionally with 90 degree corners, and one or more subsequent processing steps may modify the pattern with semi-circular line-ends and rounded corners as in pattern 402. In one of these embodiments, the subsequent processing may be done as part of a fracturing or mask data preparation (MDP) process.

The conventional technique for manufacturing a photomask for an integrated circuit is to form the pattern of the design on a reticle using a set of non-overlapping VSB shots, where the union of the set of shots is the desired pattern. In the fracturing or mask data preparation (MDP) process which determines the set of VSB shots, conventionally either all shots have the same dosage, before correction for long-range effects. Formation of curvilinear patterns using this conventional technique, however, requires a very large number of shots, which is prohibitively time-consuming.

U.S. Pat. Nos. 7,759,027 and 7,901,850, both of which are owned by the assignee of the present patent application and which are incorporated by reference for all purposes, disclose an unconventional method of fracturing or mask data preparation (MDP) in which intentional shot overlap for writing patterns is used, and in which the union of the shots used to form a pattern can be different than the pattern itself. When overlapping shots are used, charged particle beam simulation can be used to determine the pattern that the resist on the reticle will register. Use of overlapping shots may allow patterns to be written with reduced shot count or higher accuracy or both. U.S. Pat. Nos. 7,759,027 and 7,901,850 also disclose use of dose modulation, where the shots have assigned dosages and where the assigned dosages of shots vary with respect to the dosages of other shots, before correction for long-range effects. The terms model-based fracturing and model-based MDP are used to describe the process of determining shots using the techniques of U.S. Pat. Nos. 7,759,027 and 7,901,850.

Figure 5A:
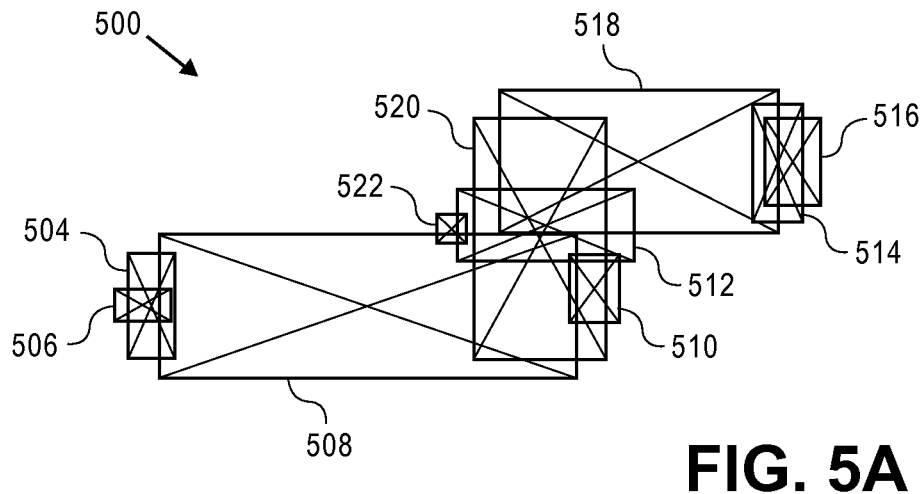
FIG. 5A illustrates an example of a set of model-based VSB shots which can form the pattern of FIG. 4A on a surface.
Figure 5B:
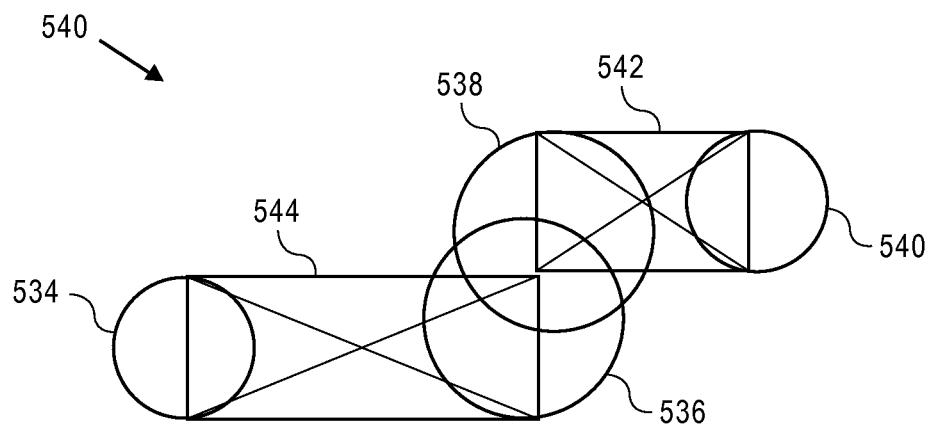
FIG. 5B illustrates an example of a set of model-based CP and VSB shots which can form the pattern of FIG. 4A on a surface.

FIGS. 5A&B illustrate two examples of sets of shots created using model-based fracturing, using pattern 402 as a desired target pattern. The sets of shots in FIGS. 5A and 5B are shown in an enlarged size compared to FIG. 4A and pattern 402 for clarity. FIG. 5A illustrates an example of a set of VSB shots 500 that can be used to form pattern 402. Set of shots 500 comprises ten shots, including shot 504, shot 506, shot 508, shot 510, shot 512, shot 514, shot 516, shot 518, shot 520, and shot 522. Each shot in the set of shots 500 is illustrated with an interior "X", to aid identification of individual shots. As can be seen, many shots in the set of shots 500 overlap each other. The number of VSB shots required to form a curvilinear pattern will, in general, depend on the required precision of the pattern to be formed on the surface. The pattern that would be formed on a resist-coated surface such as a reticle by the set of shots 500 can be determined using particle beam simulation. Particle beam simulation can be used to model a variety of physical effects, including forward scattering, backward scattering, resist diffusion, Coulomb effect, etching, fogging, loading and resist charging. FIG. 5B illustrates another set of shots 540 that can be used to form pattern 402. Set of shots 512 comprises 6 shots, including shot 534 and shot 540 that use a small circular character projection (CP) character, shot 536 and shot 538 that use a larger circular CP character, and shot 542 and shot 544 which are VSB shots. Shot 542 and shot 544 are each illustrated with an interior "X" to aid identification. The usage of VSB and non-rectangular CP shots together in shot set 540 may allow a reduced number of shots compared to shot set 500 which uses only VSB shots, to achieve a predetermined level of accuracy.

Figure 6A:
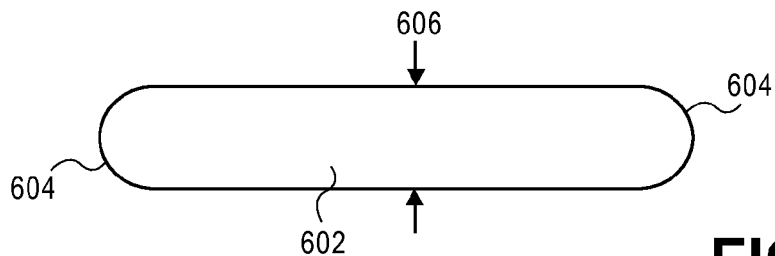
FIG. 6A illustrates an example of a design pattern with semi-circular line-ends.
Figure 6B:
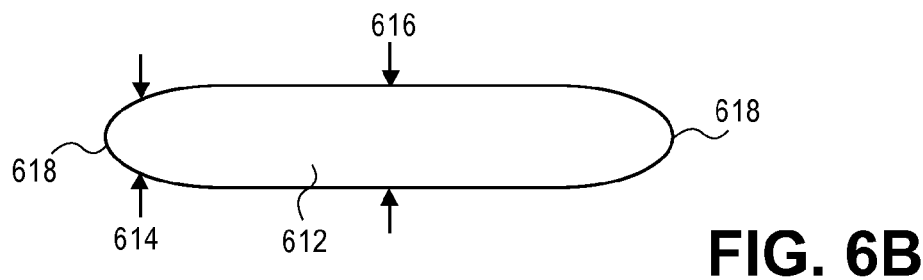
FIG. 6B illustrates an example of a substrate pattern that may be formed using optical lithography and a photomask manufactured with the pattern of FIG. 6A.
Figure 6C:
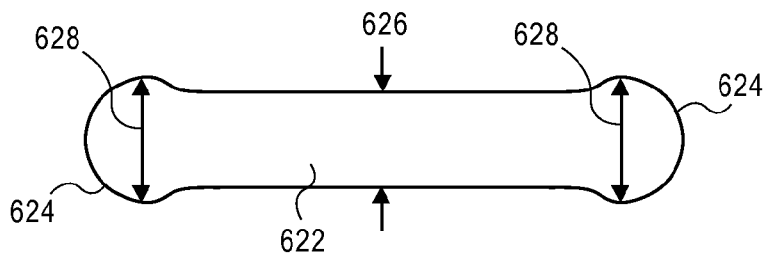
FIG. 6C illustrates an example of a design pattern with enlarged semi-circular line-ends, according to an embodiment of the current invention.
Figure 6D:
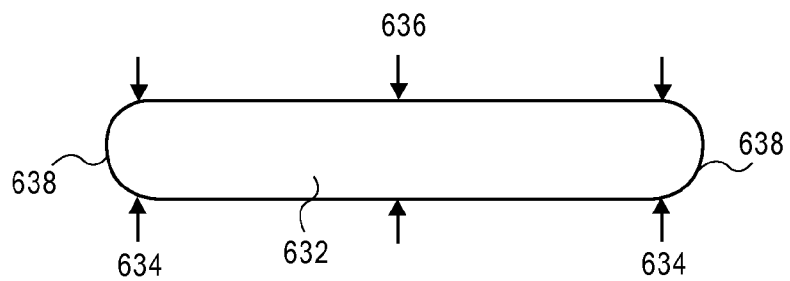
FIG. 6D illustrates an example of a substrate pattern that may be formed using optical lithography and a photomask manufactured with the pattern of FIG. 6C.

FIG. 6A illustrates an example of a linear pattern or path 602 designed according to one embodiment of the present invention, the path 602 having a width 606 and having semi-circular line-ends 604. FIG. 6B illustrates an example of a path 612 that may be formed on a substrate using an optical lithographic process with a photomask made from the designed path 602. Due to limitations of the optical lithographic process, the width 614 near the path line-ends 618 may be significantly less than the width 616 near the middle of the path. FIG. 6C illustrates an example of a linear pattern or path 622 designed according to another embodiment of the present invention, so as to reduce the line narrowing near the line-ends. As can be seen, the path 622 is rounded at line-ends 624, like line-ends 604 of path 602. Also, the width 626 of path 622 in its middle section is the same as width 606 of path 602. Unlike line-ends 604, however, the diameter 628 of the partial circle at each rounded line-end 624 is larger than the width 626 of path 622 in its middle section. In other embodiments, a path may be designed similar to path 602 with width 606, and then the diameter of the path's lines ends may be enlarged to diameter 628 in a subsequent processing step, such as in a fracturing or mask data processing step. Although in the example of FIG. 6C path 622 has two line-ends, more complex paths may have more than two line-ends. FIG. 6D illustrates an example of a linear pattern or path 632 that may be formed on a substrate using a photomask made from the designed path 622. The substrate path 632 comprises two line-ends 638. Path 632 has a width 636 in its middle section, and a width 634 near each line-end 638. Compared to path 602, the use of enlarged-diameter partial circles for line-ends 624 of path 622 may cause the difference between width 636 and width 634 of substrate path 632 to be less than the difference between width 616 and width 614 of substrate path 612. Use of enlarged line-ends such as the line-ends 624 in path 622 may therefore result in a path being formed on the substrate that is closer to constant width, compared to a substrate path formed using a mask which is formed from a designed path using semi-circular line-ends with diameters matching the middle-portion line width, such as line-end 604. The reduction in path width variation on the substrate may improve the electrical characteristics of the integrated circuit containing the substrate path 632. In various embodiments, the enlarged line-end such as line-ends 624 may be created as part of the original physical design, or may be created by a subsequent processing step, either from curved line-ends 604 or from conventional 90-degree corner line-ends as in pattern 302.

When fracturing path 602, each line-end 604 may be shot with a single circular CP shot. Similarly end line of 624 of path 622 may also be shot with a single circular CP shot, using either a larger dosage and/or a larger CP character for line-end 624 compared to line-end 604. This technique is disclosed in U.S. Pat. No. 8,017,288, which is owned by the assignee of the present patent application and which is incorporated by reference for all purposes.

Figure 7A:
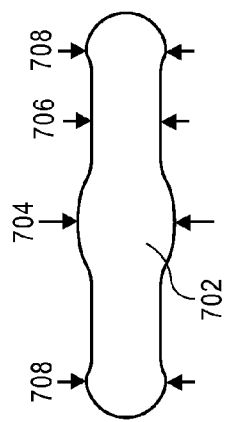
FIG. 7A illustrates an example of a variable width pattern, according to one embodiment of the current invention.
Figure 7B:
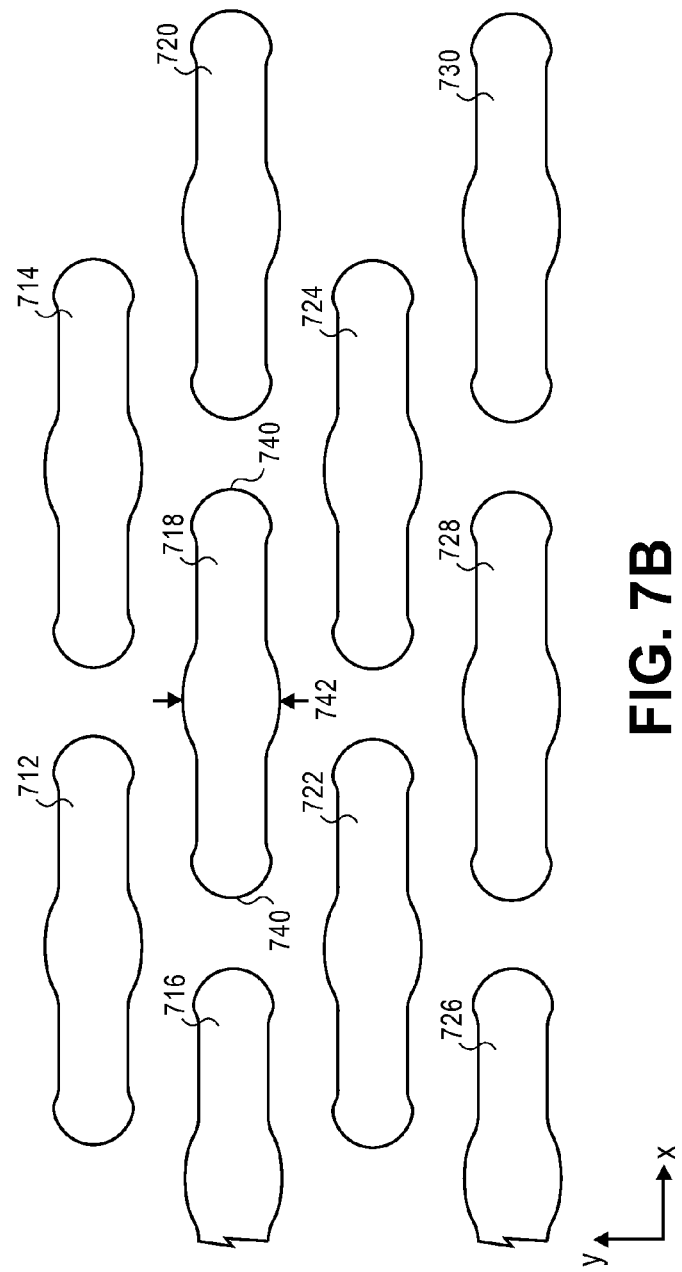
FIG. 7B illustrates an example of a group of variable width patterns.

In some semiconductor fabrication processes, a set of patterns which are all designed with the same width may result in varying-width patterns on a wafer, because the width of a pattern transferred to the wafer may vary depending on the proximity of the nearest neighboring pattern. For a given pattern width on a photomask, the width of a transferred substrate pattern may be larger if a neighboring pattern is relatively nearby, compared to the width of the same transferred substrate pattern if the nearest neighboring pattern is further distant. To compensate for this effect, pattern widths may be biased during physical design of the integrated circuit, making a designed pattern width wider in areas which are relatively more distant from neighboring patterns than in areas which are relatively closer to neighboring patterns. FIG. 7A illustrates an example of how the width of a pattern may be varied according to another embodiment of the present invention. The width of the pattern 702 at location 704 is wider than the width at location 706. Also, the diameter 708 of the semicircular line-ends is larger than the width 706. There are no sharp corners in pattern 702, allowing transfer of the pattern from a photomask to a substrate with a higher tolerance for process variations than if a pattern had been designed with right-angles or sharp corners. The lack of sharp corners in pattern 702 also results in the width of pattern 702 having a continuous second derivative. FIG. 7B illustrates a plurality of designed patterns 712, 714, 716, 718, 720, 722, 724, 726, 728 and 730 in a regular pattern. The ends of each pattern or path are offset with respect to ends of neighboring paths above or below. For example, the line-ends 740 of path 718 have different x-coordinates than the line-ends of paths 712, 714, 722 and 724. Each of the patterns in FIG. 7B has been designed with a larger width in the area where the neighboring patterns are more distant. For example, pattern 718 is widest in its middle 742, where there is a break between pattern 712 and pattern 714, and also between pattern 722 and pattern 724. These varying-width patterns in the physical design of an integrated circuit may more closely form constant-width patterns on a substrate, compared to designing constant-width patterns in the physical design. In another embodiment, the physical design may be created with constant-width patterns, and the designed patterns subsequently modified in a subsequent processing step, such as a fracturing or MDP step, into curvilinear variable width patterns.

When writing sub-wavelength patterns for the most advanced fabrication processes using optical lithography, for example in writing patterns for a 22 nm logic node process using 193 nm immersion optical lithography, it is common to require that minimum-width patterns on a layer be oriented with their longest dimension in a predetermined orientation, called a preferred direction. It is easier to perform OPC on a set of patterns which have a strong sense of a preferred direction. Additionally, a set of patterns with a preferred direction can be transferred from a photomask to a wafer or other surface using a directional light source which is adjusted to transfer most precisely patterns in that preferred direction (a process that may be referred to as source mask optimization or SMO). Returning again to FIG. 7B, the plurality of designed patterns 712, 714, 716, 718, 720, 722, 724, 726, 728 and 730 have a preferred direction, in that their major (longest) dimension is parallel with the x-axis of the Cartesian coordinate plane. Curvilinear line-ends, arcs and all other embodiments of the present invention may be used in a design in which one or more layers each has a preferred direction.

Figure 8A:
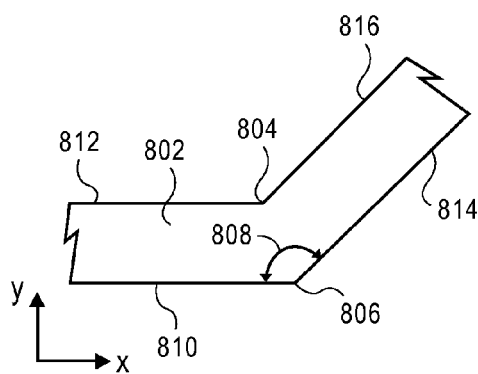
FIG. 8A illustrates an example of a pattern that is partially manhattan and partially diagonal, designed conventionally.
Figure 8B:
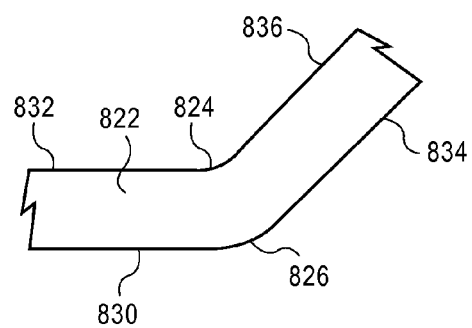
FIG. 8B illustrates an example of a pattern that is partially manhattan and partially diagonal, with arcs between the manhattan and diagonal edge portions.

Curvilinear patterns may also be used in situations where the overall direction of a pattern is at a diagonal with respect to the Cartesian coordinate axes. FIG. 8A illustrates an example of a portion of a conventionally-designed pattern 802, in which edge 812 and edge 810 are parallel to the x-axis of the Cartesian coordinate plane, and in which edge 814 and 816 are at a diagonal. Edge 810 and 814 meet at point 806 and form an obtuse interior angle 808. Edge 812 and edge 816 meet at point 804. FIG. 8B illustrates an example of a portion of a pattern 822 designed according to an embodiment of the present invention, where edge portions 830 and 832 of pattern 822 are parallel to the x-axis of the Cartesian coordinate plane, and where edge portions 834 and 836 are at a diagonal. As can be seen, horizontal edge portion 830 and diagonal edge portion 834 of pattern 822 are connected by arc 826 rather than meeting at a point. Similarly, horizontal edge portion 832 and diagonal edge portion 836 are connected by arc 824 rather than meeting at a point. In a similar way as when arcs are designed to connect orthogonal pairs of edges, the use of arcs to connect edge pairs which are not relatively orthogonal allows a diagonal or partially-diagonal pattern to be transferred to a substrate with greater fidelity compared to when using conventionally-designed patterns with sharp corners, thereby reducing sensitivity of the pattern width to process changes.

Figure 9A:
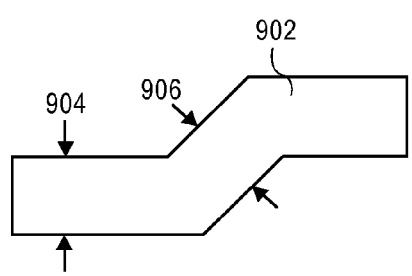
FIG. 9A illustrates an example of one type of a conventional jogged pattern.
Figure 9B:
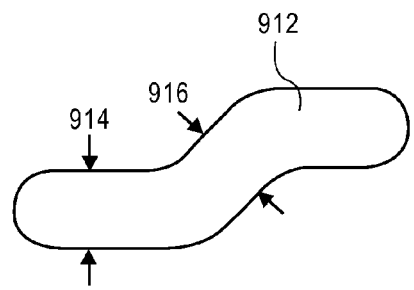
FIG. 9B illustrates an example of one type of jogged pattern containing arcs, according to an embodiment of the current invention.
Figure 9C:
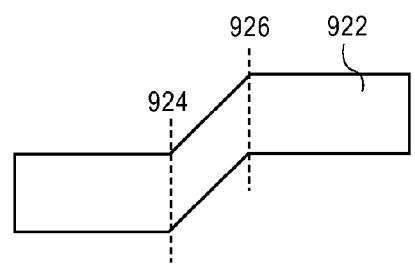
FIG. 9C illustrates an example of another type of a conventional jogged pattern.
Figure 9D:
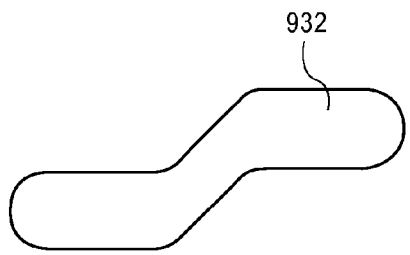
FIG. 9D illustrates an example of another type of jogged pattern containing arcs, according to an embodiment of the current invention.

FIGS. 9A-D illustrate various examples of designed patterns containing jogs. FIG. 9A illustrates an example of a pattern or path 902 with a conventional 45 degree angle jog. The jog is designed so that the width 906 of the diagonal portion of the path is the same as the width 904 of the manhattan portion of the path. FIG. 9B illustrates an example of a pattern or path 912 similar to path 902, but designed according to the present invention, using arcs to connect manhattan edges to diagonal edges. The width 916 in the diagonal portion of path 912 is the same as the width 914 of the manhattan portion of path 912. FIG. 9C illustrates another example of a pattern or path 922 with a conventional 45 degree angle jog. The path 922 is designed so the transition between manhattan and diagonal portions of the path occurs at the same x-coordinate for both the top and bottom edges of the path. For path 922 the x-coordinates of the transitions are denoted by the dashed vertical line 924 and the dashed vertical line 926. FIG. 9D illustrates an example of a pattern or path 932 which is similar to path 922, but which is designed according to the present invention, using arcs to connect manhattan edges to diagonal edges. Patterns on photomasks fabricated from designed path 912 and designed path 932 may be transferred to a substrate using optical lithography with higher-fidelity than if a photomask fabricated from path 902 or path 922 had been used. The higher-fidelity pattern transfer using curvilinear design patterns according to the present invention allows a larger process margin.

Figure 10A:
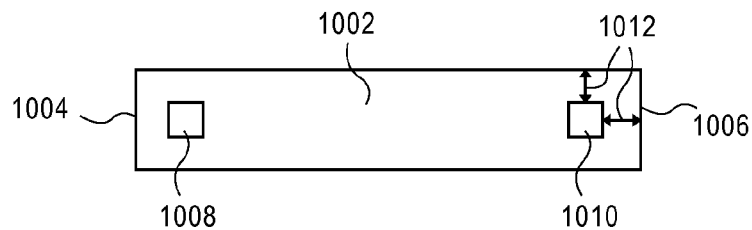
FIG. 10A illustrates a linear pattern with conventional square line-ends which encloses two conventional square contacts or vias.
Figure 10B:
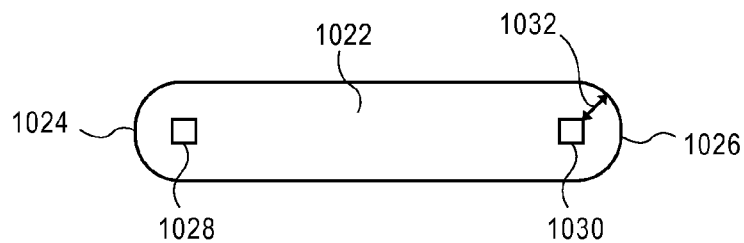
FIG. 10B illustrates a linear pattern with semi-circular line-ends which encloses two square contacts or vias.
Figure 10C:
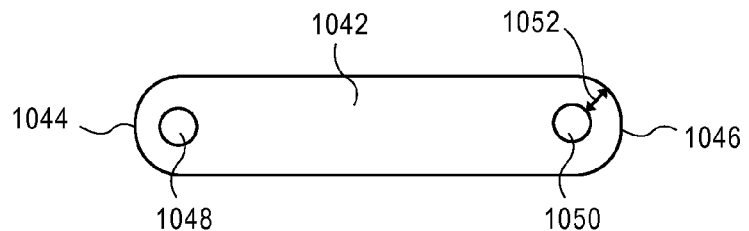
FIG. 10C illustrates a linear pattern with semi-circular line-ends, where the linear pattern encloses two circular contacts or vias, according to the current invention.

FIGS. 10A-C illustrate placement of vias or contacts relative to other patterns in a design. FIG. 10A illustrates an example of a conventional linear pattern or path 1002, such as for an interconnecting wire. Path 1002 comprises conventional squared-off line-ends 1004 and 1006, creating four 90 degree corners in path 1002. Within path 1002 are illustrated two conventional square contacts or vias: contact or via 1008 and contact or via 1010. The contact or via 1010 is designed so as to provide a predetermined minimum enclosure distance 1012 from all edges of path 1002. FIG. 10B illustrates an example of a linear pattern or path 1022 designed according to one embodiment of the present invention. Path 1022 comprises two semi-circular line-ends 1024 and 1026. Within path 1022 are illustrated two conventional square contacts or vias: contact or via 1028 and contact or via 1030. With respect to the minimum enclosure rule for contact or via 1030, the upper-right and lower-right corners of contact or via 1030 are the closest points on the contact or via 1030 to the edges of path 1022, with the enclosure distance being distance 1032. For contact or via 1030, the minimum required enclosure distance 1032 is therefore the distance that determines the maximum allowable contact size. If the required enclosure distance 1032 is the same as required enclosure distance 1012, the size of contact or via 1030 will need to be smaller than contact or via 1010. The smaller contact or via 1030 will be more difficult to manufacture than contact or via 1010.

Figure 10D:
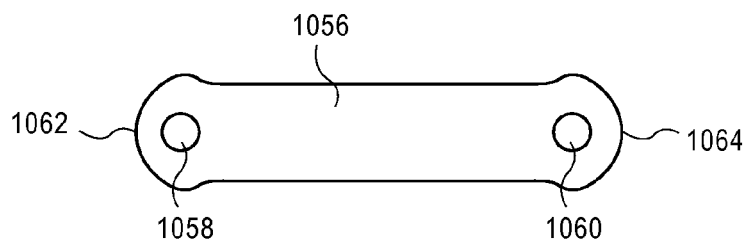
FIG. 10D illustrates a linear pattern similar to FIG. 10C, but with larger diameter semi-circular line-ends.

FIG. 10C illustrates an example of a linear pattern or path 1042 comprising two semi-circular line-ends 1044 and 1046. Within path 1042 are illustrated two circular contacts or vias, contact or via 1048 and contact or via 1050, according to another embodiment of the current invention. Contact or via 1050 is enclosed by line-end 1046 by distance 1052. Because of the circular shape of contact or via 1050, there are no corners to impact the enclosure distance as with the square contact or via 1030. The use of circular contacts or vias with semi-circular line-ends allows the contacts or vias to be of a larger area than if square contacts are used. The larger contacts or vias can be fabricated more easily. The contacts or vias may also be designed using polygons such as octagons to approximate circles. A circular contact or via shape may be formed on a reticle using a single CP shot with a circular CP character. Furthermore, the circular contact or via patterns on a photomask fabricated from the reticle can form circular contact or via patterns on a resist-coated substrate, where the circular substrate patterns more closely match the circular photomask patterns than when conventional square contacts or vias are designed and manufactured on photomasks. As previously described, the use of photomask patterns that more closely match the formed substrate patterns can reduce the sensitivity of the substrate pattern to lithographic process variations. The use of circular contacts or vias in the physical design therefore provides a reduced sensitivity of the contact or via pattern on the substrate to process variations, compared to use of conventionally-designed square contacts or vias. FIG. 10D illustrates linear pattern or path 1056, which is similar to path 1042, but in which line-end 1062 has a larger diameter than line-end 1044, and line-end 1064 has a larger diameter than line-end 1046, so as to prevent narrowing of the line-ends when path 1056 is transferred to a substrate using optical lithography. Path 1056 contains circular contact or via 1058 and circular contact or via 1060, both contacts or vias being the same size as contacts or vias 1048 and 1050.

Conventional software for integrated circuit physical design provides few features to support design of curvilinear patterns, as set forth above. In one embodiment of the present invention, curvilinear patterns may be approximated using a plurality of polygon sides, for example where the exterior angle between adjacent polygon edges is limited to a maximum of 15 to 45 degrees. In other embodiments, the physical design process is performed using conventional angular patterns, for example manhattan patterns, and then the angular patterns are subsequently modified to create curvilinear patterns. In one embodiment, the pattern modification may be done before the optical proximity correction (OPC) process. In another embodiment, the pattern modification may be done as part of the OPC process. In yet another embodiment, the pattern modification may be done as part of the mask data preparation (MDP) processing, before fracturing the data into, for example, a set of particle beam shots.

Figure 11:
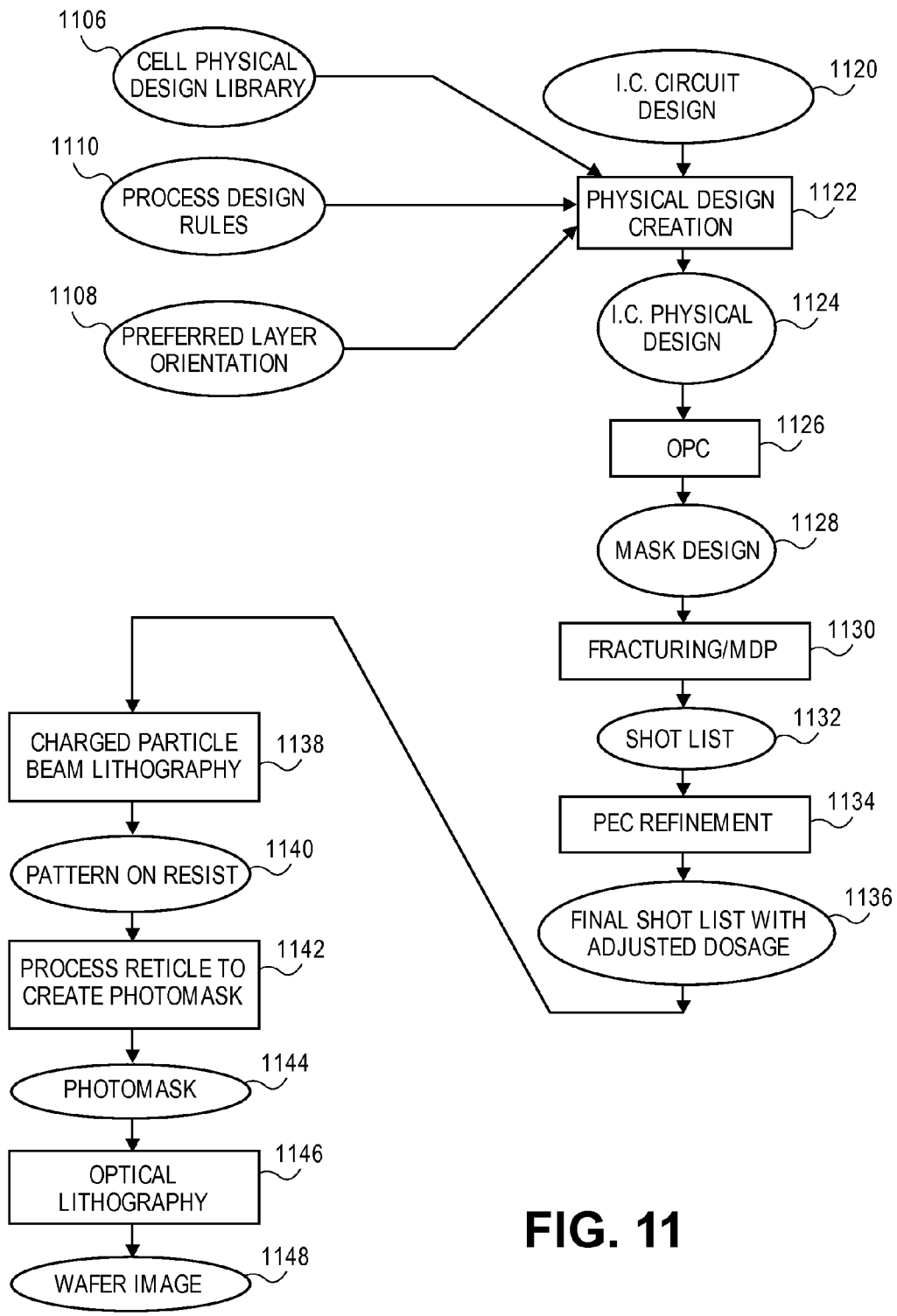
FIG. 11 illustrates an exemplary conceptual flow diagram of the present invention for manufacturing an integrated circuit.

FIG. 11 is an exemplary conceptual flow diagram of a method for manufacturing an integrated circuit according to the current disclosure. The inputs to the process are a cell physical design library 1106, a circuit design 1120 for the integrated circuit, and a set of process design rules 1110. The cell physical design library 1106 may include designs for logic functions such as NAND gates, NOR gates and various flip-flops, and may also include, for example, static random access memory (SRAM) designs. Preferred layer orientation information 1108 may also be an input to the process. The first step in the overall process is physical design creation 1122, which creates an I.C. physical design 1124, the I.C. physical design 1124 being a set of patterns on each of a plurality of layers. In accordance with one embodiment, the physical design creation process 1122 may create curvilinear patterns having no sharp corners on one or more layers and having semicircular line-ends, or may create nearly-curvilinear patterns having no corners with exterior angles greater than a predetermined maximum angle, for instance, between 15 and 45 degrees. The physical design creation process 1122 may also include creating circular or octagonal patterns for a contact and/or via layer which electrically connects a pattern on a curvilinear layer to a pattern on a different layer. Optical proximity correction (OPC) 1126 may be performed on the I.C. physical design 1124 to produce a mask design 1128. In one embodiment, optical proximity correction 1126 for a layer may include converting the physical design of an angular layer to a curvilinear design, including converting line-ends to semi-circles or near semi-circles and converting corners into arcs. In a fracturing or mask data preparation (MDP) process 1130, a set of charged particle beam shots or shot list 1132 is determined which can form the patterns of the mask design 1128 on a resist-coated surface such as a reticle. In one embodiment, each shot in the shot list 1132 may comprise a dosage. In another embodiment, the shots in the shot list 1132 may have unassigned individual shot dosages. In yet another embodiment, the fracturing or MDP processing 1130 may include converting the physical design of an angular layer to a curvilinear design, including converting line-ends to semi-circles or near semi-circles and converting corners into arcs or near-arcs. In some embodiments the fracturing/MDP process 1130 may generate complex CP shots. In other embodiments the fracturing/MDP process 1130 may generate only VSB shots. Proximity effect correction 1134 may then be performed on the shot list 1132 to create a final shot list with adjusted dosages 1136. The final shot list 1136 is used by a charged particle beam writer to expose a resist-coated reticle in step 1138 to create a pattern 1140 on a resist-coated reticle. The reticle containing the resist pattern 1140 is processed in step 1142 to create a photomask 1144. The photomask 1144 is used in an optical lithographic process 1146 to transfer the mask pattern to a resist-coated wafer. The optical lithographic process 1146 may include using directional illumination.

The OPC, fracturing, mask data preparation and wafer optimization flows flows described in this disclosure may be implemented using general-purpose computers with appropriate computer software as computation devices. Due to the large amount of calculations required, multiple computers or processor cores may also be used in parallel. In one embodiment, the computations may be subdivided into a plurality of 2-dimensional geometric regions for one or more computation-intensive steps in the flow, to support parallel processing. In another embodiment, a special-purpose hardware device, either used singly or in multiples, may be used to perform the computations of one or more steps with greater speed than using general-purpose computers or processor cores. In one embodiment, the special-purpose hardware device may be a graphics processing unit (GPU). In one embodiment, the optimization and simulation processes described in this disclosure may include iterative processes of revising and recalculating possible solutions, so as to minimize either the total number of shots, or the total charged particle beam writing time, or some other parameter. In another embodiment, an initial set of shots may be determined in a correct-by-construction method, so that no shot modifications are required.

While the specification has been described in detail with respect to specific embodiments, it will be appreciated that those skilled in the art, upon attaining an understanding of the foregoing, may readily conceive of alterations to, variations of, and equivalents to these embodiments. These and other modifications and variations to the present method for manufacturing a semiconductor device, and for fracturing or mask data preparation, may be practiced by those of ordinary skill in the art, without departing from the spirit and scope of the present subject matter, which is more particularly set forth in the appended claims. Furthermore, those of ordinary skill in the art will appreciate that the foregoing description is by way of example only, and is not intended to be limiting. Thus, it is intended that the present subject matter covers such modifications and variations as come within the scope of the appended claims and their equivalents.

What is claimed is:

1. A method for manufacturing a semiconductor device on a substrate, the method comprising the steps of:
    creating a physical design for the semiconductor device, the physical design comprising an interconnect wire, wherein the interconnect wire comprises a curvilinear path having at least two line-ends; and
    forming the curvilinear path on a photomask.

2. The method of claim 1, further comprising forming the curvilinear path on the substrate using an optical lithographic process and the photomask.

3. The method of claim 1 wherein the curvilinear path includes a 90 degree arc.

4. The method of claim 1 wherein a line-end of the curvilinear path is semi-circular or nearly semi-circular.

5. The method of claim 4 wherein the diameter of the semi-circular line-end is larger than the width of the curvilinear path near a central lengthwise portion of the path.

6. The method of claim 1 wherein the width of the curvilinear path varies along its length, and wherein the second derivative of the path width is continuous, and wherein the path width is larger in portions of the path which are more distant from neighboring patterns.

7. The method of claim 1 wherein the curvilinear path on the photomask is formed with a set of shots using charged particle beam lithography.

8. The method of claim 7 wherein all shots in the set of shots are variable shaped beam (VSB) shots, wherein at least two shots in the set of shots overlap each other, and wherein the union of all shots in the set of shots is different from the curvilinear path.

9. The method of claim 8 wherein the VSB shots have assigned dosages, and wherein the dosages of the VSB shots vary with respect to each other before correction for long-range effects.

10. The method of claim 7 wherein a shot in the set of shots is a character projection (CP) shot using a circular CP character.

11. The method of claim 1 wherein the curvilinear path is on a first layer of the physical design, and wherein the physical design further comprises a contact or via layer containing a circular or nearly circular shape which electrically connects the curvilinear path on the first layer to a shape on a third layer.

12. A method for fracturing or mask data preparation (MDP) comprising the steps of:
    inputting a physical design for a layer of a design, the physical design comprising a manhattan path;
    modifying the pattern for the manhattan path to create a curvilinear path pattern; and
    generating a set of charged particle beam shots which is capable of forming the curvilinear path pattern on a resist-coated surface.

13. The method of claim 12 wherein the step of modifying comprises forming a semi-circular or nearly-semicircular line-end.

14. The method of claim 13 wherein the diameter of the semi-circular or nearly-semicircular line-end is larger than the width of the curvilinear path pattern in a central lengthwise portion of the pattern.

15. The method of claim 12 wherein the step of modifying comprises changing a 90 degree corner in the outline of the manhattan path into a 90 degree arc or near-arc.

16. The method of claim 12 wherein the step of modifying comprises changing an obtuse interior angle in the outline of the manhattan path into an arc or near-arc in the curvilinear path pattern.

17. The method of claim 12 wherein the step of modifying comprises increasing the width of the pattern in areas where no nearby patterns exist on the layer, wherein the second derivative of the width of the created curvilinear path pattern is continuous.

18. The method of claim 12 wherein all shots in the set of charged particle beam shots are variable shaped beam (VSB) shots, wherein at least two shots in the set of charged particle beam shots overlap each other, and wherein the union of all shots in the set of charged particle beam shots is different from the curvilinear path pattern.

19. The method of claim 18 wherein the VSB shots have assigned dosages, and wherein the dosages of the VSB shots vary with respect to each other before correction for long-range effects.

20. The method of claim 12 wherein the step of generating comprises using charged particle beam simulation.

21. The method of claim 20 wherein the charged particle beam simulation includes at least one of a group consisting of forward scattering, backward scattering, resist diffusion, Coulomb effect, fogging, loading and resist charging.

22. The method of claim 12 wherein a shot in the set of charged particle beam shots is a character projection (CP) shots using a circular CP character.

23. A system for fracturing or mask data preparation (MDP) comprising:

an input physical design;

a device capable of modifying patterns for manhattan paths in the physical design to create curvilinear path patterns; and a device capable of generating a set of charged particle beam shots which is capable of forming the curvilinear path patterns on a resist-coated surface.

24. The system of claim 23 wherein the set of charged particle beam shots comprises a set of variable shaped beam (VSB) shots, wherein at least two shots in the set of VSB shots overlap, and wherein the union of the set of charged particle beam shots does not equal the curvilinear path patterns.

25. The system of claim 23 wherein the set of charged particle beam shots comprises a character projection (CP) shot using a circular CP character.

* * * * *